United States Patent [19]

Van Asselt

[11] Patent Number: 4,805,169
[45] Date of Patent: Feb. 14, 1989

[54] LOCAL AREA NETWORK OPERATING ON THE MULTIPLE BUS SYSTEM

[75] Inventor: Gosuinus Van Asselt, Nijverdal, Netherlands

[73] Assignee: Hollandse Signaalapparaten B.V., Hengelo, Netherlands

[21] Appl. No.: 827,310

[22] Filed: Feb. 7, 1986

[30] Foreign Application Priority Data

Mar. 1, 1985 [NL] Netherlands ............... 8500571

[51] Int. Cl.$^4$ .................................. H04J 3/02
[52] U.S. Cl. ............................. 370/85; 370/88
[58] Field of Search .................. 370/85, 86, 88, 94

[56] References Cited

U.S. PATENT DOCUMENTS

| 4,340,775 | 7/1982 | Gesek et al. | 370/85 |
| 4,536,877 | 8/1985 | Livingston et al. | 370/85 |
| 4,625,307 | 11/1986 | Tulpule et al. | 370/85 |

OTHER PUBLICATIONS

The Fourteenth International Conference on Fault Tolerant Computing; IEEE, NY; P. Chilton et at: Meunet-A High Performance, High Availability Packet Switch 1984, pp. 164–169.

Large Schale Integration; North Holland; Amsterdam; 1978 Ch. Steigner et al: Assco-Solution to Mutual Exclusion and Deadlock Situations in a Multiprocessor System pp. 82–93.

Proceedings IEEE 1981 Naecon; NY; vol. 1, pp. 309–317; Larimer et al. -A Solution to Bus Contention. Conference Proceedings of the 10th Annual International Symposium on Computer Architecture, pp. 334–340 ACM: NY; L. Philipson et al. "A Communication Structure for a Multiprocessor Computer with Distributed Global Memory".

Primary Examiner—Douglas W. Olms
Assistant Examiner—Wellington Chin
Attorney, Agent, or Firm—Thomas A. Briody; Jack E. Haken; Leroy Eason

[57] ABSTRACT

A local area network operates on the multiple bus system and with a plurality of interface modules connected between the multiple bus system and data-processing-/generating subsystems. Each interface module is provided with several autonomously operating bus adapters connected to separate lines of the multiple bus system including locally controlled buffer memory means. Each interface module is further provided with a local distribution circuit connected to the buffer memory means of the interface module and to a host interface unit for the subsystem to be connected to the interface module.

2 Claims, 4 Drawing Sheets

LOCAL AREA NETWORK OPERATING ON THE MULTIPLE BUS SYSTEM

BACKGROUND OF THE INVENTION

The invention relates to a local area network operating on the multiple bus system and with a plurality of interface modules connected between the multiple bus system and data-processing/generating subsystems.

Such a network is known from the publication of Ch. Steigner and K. Waldschmidt: "ASSCO—A Solution to Mutual Exclusion and Deadlock Situations in a Multiprocessor System", in the issue of H. W. Lawson, H. Berndt, G. Hermanson (eds): "Large Scale Integration", EUROMICRO 1978, North-Holland Publishing Company, pp. 82–92. FIG. 1 in this publication shows a diagram of a multiprocessor system, in which the interface modules connected between the multiple bus system and link subsystems (or processor modules) consist of bus switches controlled by the coordination system for the selection of one of the individual bus lines. A local area network thus configured has the disadvantage that only one of the bus switches can be activated at a time for each interface module, permitting only a single data flow between the respective processor module and the multiple bus system. In this way it is not possible to deliver any data at all to the multiple bus system during the data reception from the multiple bus system; this may present difficulties, especially with prolonged and/or frequent writing of new data into the processor-module memory.

SUMMARY OF THE INVENTION

The present invention has for its object to provide a local area network of the type set forth in the opening paragraph, whereby the above disadvantage is obviated.

According to the invention, each interface module in a local area network of the type described above is provided with several autonomously operating bus adapters connected to separate lines of the multiple bus system, including locally controlled buffer memory means, and with a local distribution circuit connected to the buffer memory means of the interface module and to a host interface unit for the subsystem to be connected the interface module.

Such a local area network permits that, during the transfer from one of the lines of the multiple bus system to a bus adapter of an interface module, data are transferred via other bus adapters of the same interface module to the remaining bus lines.

BRIEF DESCRIPTION OF THE DRAWINGS

The invention will now be described in more detail with reference to the accompanying drawings, of which.

DESCRIPTION OF THE PREFERRED EMBODIMENTS

Figure 1:
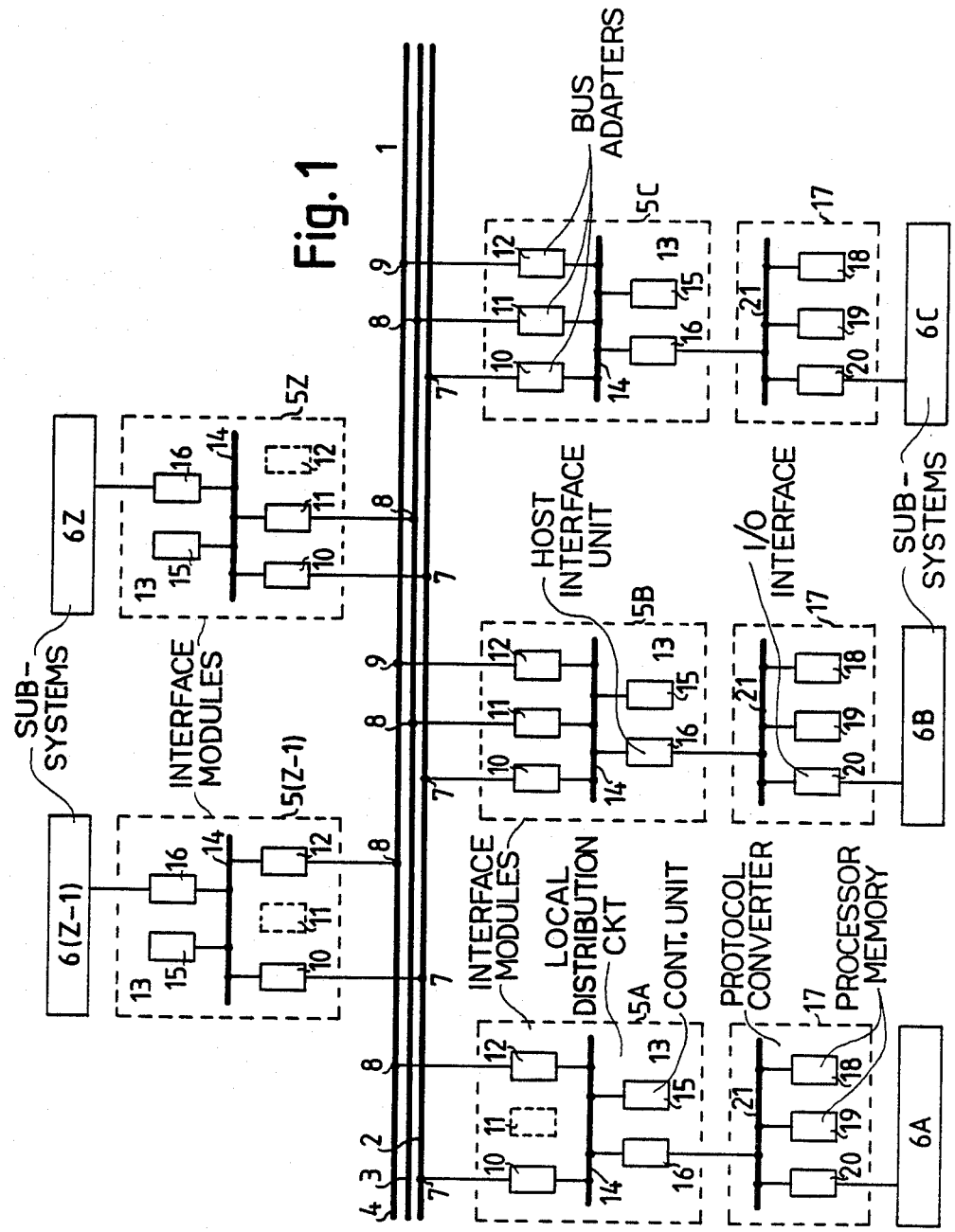
FIG. 1 is a block diagram illustrating a local area network operating on the multiple bus system, as applied in an interactive multiprocessor system.

In the local area network of FIG. 1 the multiple bus system is designated by reference numeral 1. A multiple bus system is here understood to mean an assembly of bus lines, permitting a parallel transfer of data along a plurality of subsystems. It is however possible to install these lines separately. For instance, with a triple bus system installed in a ship in the direction of the fore-and-aft line, a bus line can be laid along each side wall and through the center; consequently, besides the primary effect of the invention, viz. the fast access facilities of the connected subsystems to the multiple bus system, and the first secondary effect, viz. the purely functional redundancy of the communication network, another secondary effect, viz. a topographic redundancy of the network, is obtained.

The separate bus lines may be of various types (unidirectional clockwise cable, telephone wire pair, coax cable, triaxial cable, fiber-optic cable, etc.). In FIG. 1 the multiple bus system comprises three bus lines 2, 3 and 4, permitting the connection of interface modules 5A–5Z. Each interface module 5I, where $I = A, \ldots, Z$, is connected to one or several bus lines, viz. 2, 3 and 4, enabling the transfer of data between the multiple bus system 1 and the subsystem 6I connected to the interface module 5I. To obtain redundancy, it is however advisable to connect such an interface module to a larger number of bus lines than deemed strictly necessary for a smooth transfer of data.

To transmit the data via the multiple bus system, an interface module 5I has one bus adapter 10 (or 11, 12) for each connection to this system. Thus, in the embodiment of the local area network according to FIG. 1, each of the interface modules 5A, 5(Z-1) and 5Z are connected to two of the three lines of the multiple bus system 1 via two bus taps 7 and 8 (or 9), and the remaining interface modules 5B and 5C to all bus lines via bus taps 7, 8 and 9. Therefore, interface modules 5A, 5(Z-1) and 5Z are equipped with two bus adapters 10 and 11 (or 12) and each of the other interface modules 5B and 5C with three bus adapters 10, 11 and 12. The distribution of the messages generated by a subsystem 6I over the available bus adapters 10, 11, (12) for delivery to the multiple bus system 1 and the transfer of the messages received by bus adapters 10, 11, (12) of the multiple bus system 1 require the incorporation of a local distribution circuit 13 in each interface module 5I. Such a distribution circuit 13 may comprise, for example, a local bus line 14, a distribution unit 15 functioning as control unit, and a host interface unit 16, which units 15 and 16 are connected to bus line 14. In such a case, the data traffic to and from the subsystem concerned proceeds via the host interface unit 16. The data transfer within the interface module is preferably carried out on the basis of priority and/or extent of the transfer. After being programmed from distribution unit 15, bus adapters 10, 11 and 12, capable of fully autonomous operation, handle the supplied data internally.

If with the transmission and receipt of messages a subsystem follows the protocol of the multiple bus system, the subsystem can be connected to the host interface unit 16 of the interface module without the intervention of a protocol converter 17. In FIG. 1 this is applicable to subsystems 6(Z-1) and 6Z. Through the presence of distribution unit 15 in interface modules 5(Z-1) and 5Z, the subsystems 6(Z-1) and 6Z have a separate buffer memory for the transmission and reception of messages under supervision of distribution unit 15. If subsystems 6(Z-1) and 6Z are suitable to perform the task of the distribution unit, the distribution unit 15 and the host interface unit 16 in interface modules 5(Z-1) and 5Z may be omitted. Since a subsystem can also be supplied by other sources, it should be taken into account that the protocol of such a subsystem may deviate from that of the multiple bus system 1; hence, in such a case a protocol converter 17 is essential. For instance, it is possible that a subsystem is able to produce and accept analogue data only. It is also possible that the data received and produced by a subsystem is digital, but that the message format handled by the subsystem deviates from that of the multiple bus system 1. The required protocol converter 17 can be considered to be generally known, a feasible embodiment being a processor 18, a host memory 19 and an I/O interface unit 20, all of which connected to a host bus line 21. Connection of a subsystem to the multiple bus system 1 is realised through coupling of the host interface unit 16 to the host bus line 21 and of the subsystem to the I/O interface unit 20. The entire data traffic within the protocol converter 17 is controlled by the host processor 18. If necessary, the desired analogue-digital or digital-analogue conversion of data received from or destined for the subsystem occurs in I/O interface unit 20.

The host processor 18 arranges the subsystem-supplied data in the desired format for temporary storage in memory 19. After requesting the data stored in memory 19, distribution unit 15 passes these data to one of the bus adapters. The receiving bus adapter provides for further transfer of these data to the multiple bus system 1. The reverse of this data process applies to the conversion of messages received from the multiple bus system by the bus adapters for the connected subsystem.

Figure 2:
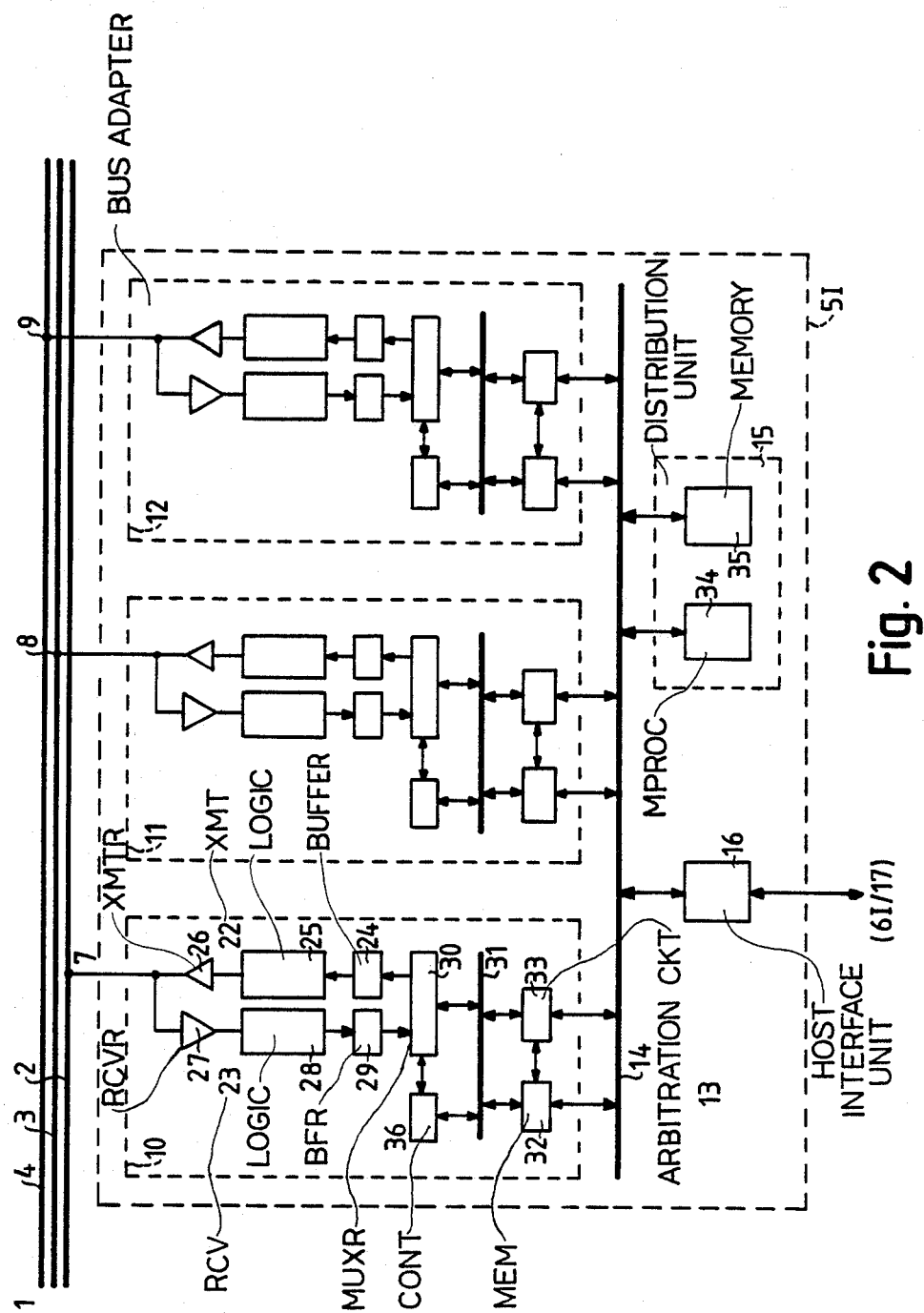
FIG. 2 is a block diagram illustrating a feasible embodiment of an interface module of the network of FIG. 1, and FIGS. 3 and 4 are block diagrams illustrating special embodiments of bus adapters of the interface module in FIG. 2.

A particularly favourable embodiment of an interface module 5I is depicted in FIG. 2. As shown in FIG. 2, the multiple bus system 1 consists of three bus lines 2, 3 and 4, while the interface module is provided with three bus adapters 10, 11 and 12, including the required bus taps 7, 8 and 9 for connection to the multiple bus system 1. Although the protocol for the bus system may be realised in various ways as far as the data link and the physical set-up are concerned, it is preferable to utilise the CSMA/CD protocol in accordance with the IEEE-802.3 specifications, as known from the U.S. Pat. No. 4,063,320; in such a case, the traffic of messages between bus adapters 10, 11 and 12 and bus lines 2, 3 and 4 is based on the CSMA/CD principle.

Each of the bus adapters 10, 11 and 12 comprises a transmitting channel 22 and a receiving channel 23; transmitting channel 22 contains a series-connected output buffer 24, a logic circuit 25 for the parallel/serial conversion of the signal transmitted, and a transmitter 26; similarly, the receiving channel 23 contains a series-connected receiver 27, a logic circuit 28 for the serial/parallel conversion of the signal received, and an input buffer 29. Each of the bus adapters is further equipped with a collision detector (not shown in the figure); such a detector is of common knowledge on account of the above-cited U.S. Pat. No. 4,063,220. A multiplex circuit 30 connects input and output buffers 29 and 24 to an internal bus line 31, also connecting memory means 32 and associated arbitration means 33. Memory means 32 functions as a buffer memory for the storage of messages transmitted and received to be able to compensate for differences in transmission speeds of messages between the local bus line 14 and the multiple bus system. On request, the arbitration means 33 indicates the location where a message may be written in memory means 32.

As already stated, the transfer of messages between a bus adapter and the associated bus line 2, 3 or 4 is fully autonomous. To this effect, a bus adapter is provided with a local control unit 36, which carries out the commands received from distribution unit 15 and which controls the frame transmission. Unit 36 also handles all activities in connection with the frame reception, such as buffer management and frame and address identification. If it is not possible to send a message from memory means 32 to transmitting channel 22 via multiplex circuit 30, the command to this effect is retained in the local control unit 36 for retransmission at a later time.

A practical embodiment of a bus adapter as described is obtained, for example, with the aid of an 8201 Ethernet Serial Interface, a Local Communication Controller 82586 and a Dual Port Memory, described in the publication: "The Complete Vlsi-LAN Solution" of Intel.

The interface module further comprises a local bus line 14, connected to which line are memory means 32 and associated arbitration means 33 of each bus adapter, as well as distribution unit 15 (such as a microprocessor 34 (the MC 68000) including a program and data memory 35) and the host interface unit 16 for the connection of a subsystem, with or without the insertion of a data converter 17.

In view of a high degree of standardization within the local area network, the interface modules may be designed to allow for the presence of a maximum number of bus adapters. Bus adapters not required to be involved in the multiple bus system must be either left disconnected from the multiple bus system or kept inactive during the programming phase by distribution unit 15 with respect to the data transfer. Bus adapters 11 of interface modules 5A and 5(Z-1), as well as those (12) of interface module 5Z, may be regarded to operate in such a capacity.

Although the present invention is explained by considering a multiple bus system with three bus lines, the invention is in no way limited to this number, and an arbitrary number of bus lines and bus adapters for each interface module can be used.

In spite of the fact that the local area network here described is suitable for the transfer of data of different nature, it is recommendable to transmit timing and stabilization data over separate lines. If nevertheless timing and stabilization data are required to be transmitted via the multiple bus system, the communication network has to be adapted in some way, as will be discussed below.

Figure 3:
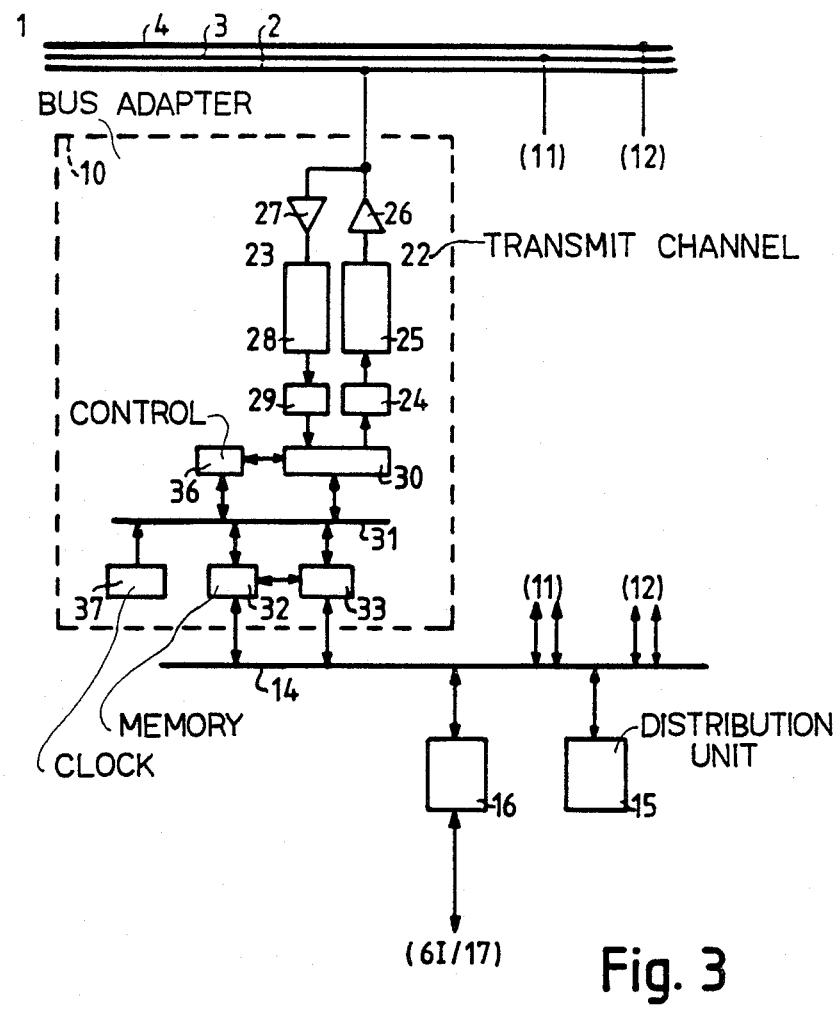

FIG. 3 is a special embodiment of a bus adapter suitable for the generation of the system time and the transmission of data, related thereto, to other bus adapters. This adapter therefore comprises a digital clock unit 37 connected to the internal bus line 31. Memory means 32 contains a time frame which on command of the distribution unit 15 is read out and provided with the clock data of unit 37. The time frame is then sent over transmitting channel 22 to the connected bus line of the multiple bus system 1. If this data is not admitted to this bus line because of the presence of other information on the bus line or garbling of the time frame during transmission of this frame over the bus line, the command has to be re-executed, be it with new data from clock unit 37. This is possible, as each command of the distribution unit 15 is entered in control unit 36. In such a case, unit 36 autonomously makes a new attempt to get the time frame with the new clock data on the bus line. In view of redundancy, other bus adapters (11 and/or 12) can be provided with such a clock facility. Distribution unit 15 selects the adapter to supply time data to the multiple bus system.

In case another bus adapter receives the time frame to synchronize a local clock unit with clock unit 37, a provision must be made in the receiving bus adapter.

Figure 4:
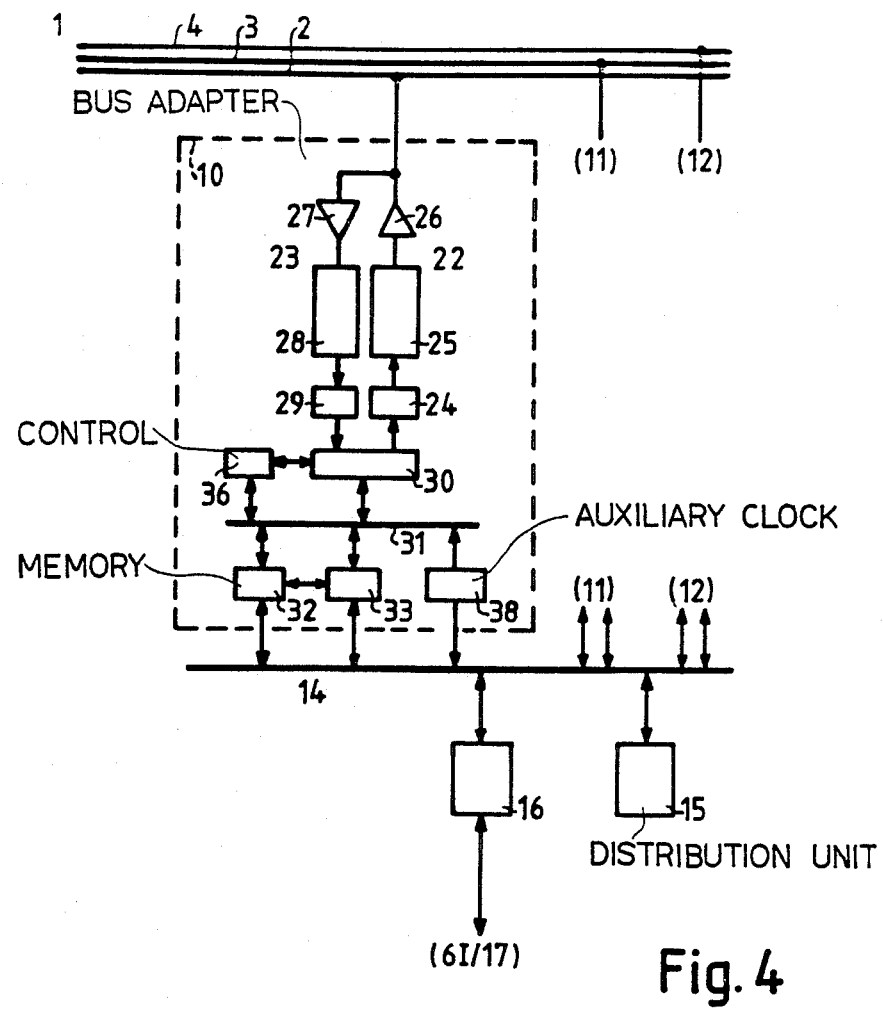

As indicated in FIG. 4, the bus adapter also comprises an auxiliary clock unit 38 connected to internal bus line 31 and local bus line 14. With the reception of a time frame the time value thereof is loaded in memory means 32 at a fixed location, while control unit 36 is activated through a special "type field" in the time frame. Control unit 36 then ensures that auxiliary clock unit 38 builds up a count value from zero; this count value is representative of the time elapsed since the reception of the time frame. On requesting the time data from the bus adapter, distribution unit 15 receives the time value recorded in memory means 32, as well as the count value built up in auxiliary clock unit 38. As the transmission of the time frames by the adapter indicated in FIG. 4 and the request for the time data by distribution unit 15 occur frequently, an error in the count value of auxiliary clock unit 38 through an incorrect count frequency is negligible. The time data requested is used for time synchronization with respect to the clock unit of the connected subsystem.

If for reasons of redundancy several bus adapters of the same bus interface circuit are provided with clock unit 37, this provision should, as a matter of course, also be made regarding the receive facility in the interface modules in respect of the time frame. In such a case, also the auxiliary clock unit 38 must be present in other bus adapters of the bus interface modules.

With the transmission of information in accordance with the broadcast or multicast principle via the multiple bus system, it is very well possible that the operating frequency of this information used by the subsystems varies widely. This is, for example, the case with the measuring values obtained with the stabilization equipment on board a ship. Such information is stored in memory means 32 containing for each type of information a fixed memory location, in which the information previously held is updated. Acting upon command, distribution unit 15 is able to request at all times the most recent stabilization data from memory means 32 at an arbitrary frequency for the connected subsystem.

I claim:

1. A local area network operating on a multiple bus system with a plurality of interface modules connected between said multiple bus system and a plurality of data-processing/generating subsystems, wherein each of said interface modules is provided with buffer memory means, a local distribution circuit, and a host interface unit through which each of said subsystems is connected to one of said interface modules, wherein each interface module includes:

a plurality of independently operating bus adapters, each comprising a transmitting and receiving channel connected to one line of said multiple bus system for receiving and transmitting data signifying the system time applicable to said network, and a multiplexer; said buffer memory means being within the respective bus adapters and connected to the multiplexer therein through an internal bus line, and, being locally controlled;

a local bus interconnecting said local distribution circuit, said host interference unit and said buffer memory means;

means within each bus adapter to detect whether the line of the multiple bus system to which it is connected is free, and to transmit data stored in said buffer memory means to such line of said multiple bus system as soon as such line is free; and respective auxiliary clock means in the respective bus adapters connected between said internal bus line and said local distribution circuit, each of said auxiliary clock means providing a time count which resets to zero value in response to each transmission of system time data by the associated bus adapter.

2. A local area network operating on a multiple bus system with a plurality of interface modules connected between said multiple bus system and a plurality of data-processing/generating subsystems, wherein each of said interface modules is provided with buffer memory means, a local distribution circuit, and a host interference unit through which each of said subsystems is connected to one of said interface modules, wherein each interface module includes:

a plurality of independently operating bus adapters each having a transmitting and receiving channel connected to one line of said multiple bus system and a multiplexer; said buffer memory means being within the respective bus adapters and connected to the multiplexer therein through an internal bus line, and being locally controlled;

a local bus interconnecting said local distribution circuit, said host interface unit and said buffer memory means;

means within each bus adapter to detect whether the line of the multiple bus system to which it is connected is free, and to transmit data stored in said buffer memory means to such line of said multiple bus system as soon as such line is free; and means to generate data in said transmitting channel concerning the system time applicable to the network, such means comprising;

a clock circuit in each bus adapter and connected to said local bus therein, said clock circuit counting clock time;

means for storing the clock time so counted in said locally controlled buffer memory means; and means for refreshing the clock time of said clock circuit at the moment said line of the multiple bus system to which such bus adapter is connected is detected as free.

* * * * *